United States Patent
Hamelin et al.

(10) Patent No.: US 10,853,077 B2
(45) Date of Patent: *Dec. 1, 2020

(54) HANDLING INSTRUCTION DATA AND SHARED RESOURCES IN A PROCESSOR HAVING AN ARCHITECTURE INCLUDING A PRE-EXECUTION PIPELINE AND A RESOURCE AND A RESOURCE TRACKER CIRCUIT BASED ON CREDIT AVAILABILITY

(71) Applicant: HUAWEI TECHNOLOGIES CO., LTD., Shenzhen (CN)

(72) Inventors: Louis-Philippe Hamelin, Montreal (CA); Peter Man-Kin Sinn, Nepean (CA); Chang Lee, Montreal (CA); Paul Alepin, Montreal (CA); Guy-Armand Kamendje Ichokobou, Verdun (CA); Olivier D'Arcy, Longueuil (CA); John Edward Vincent, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/005,553

(22) Filed: Jan. 25, 2016

(65) Prior Publication Data
US 2017/0060583 A1 Mar. 2, 2017

Related U.S. Application Data

(60) Provisional application No. 62/210,121, filed on Aug. 26, 2015.

(51) Int. Cl.
*G06F 9/38* (2018.01)
*G06F 9/50* (2006.01)

(52) U.S. Cl.
CPC .......... *G06F 9/3836* (2013.01); *G06F 9/3867* (2013.01); *G06F 9/50* (2013.01)

(58) Field of Classification Search
CPC ........ G06F 9/3836; G06F 9/50; G06F 9/5016; G06F 9/5061; G06F 9/5077
See application file for complete search history.

(56) References Cited

U.S. PATENT DOCUMENTS

| | | | | |
|---|---|---|---|---|
| 5,073,855 A | * | 12/1991 | Staplin | G06F 9/3836 712/217 |
| 8,176,298 B2 | * | 5/2012 | Hass | H04L 49/00 712/10 |

(Continued)

FOREIGN PATENT DOCUMENTS

| CN | 101606130 A | 12/2009 |
|---|---|---|
| CN | 104823129 A | 8/2015 |

OTHER PUBLICATIONS

"Working with Combinational Logic", 2010, pp. 1-13.*
(Continued)

*Primary Examiner* — David J. Huisman
(74) *Attorney, Agent, or Firm* — Slater Matsil, LLP

(57) ABSTRACT

The method can be performed in a processor integrated circuit having an instruction decoder and a plurality of shared resources, a resource tracker circuit having a plurality of credit units associated with corresponding ones of the shared resources in a manner to be updatable based on availability of the shared resources, and a resource matcher connected to receive a resource requirement signal from the decoder and connected to receive a resource availability signal from the resource tracker. The method can include performing a determination of whether or not the resource requirement signal matches the resource availability signal, and, upon a positive determination, dispatching corresponding instruction data, updating the status of a corresponding (Continued)

one or more of the credit units, and preventing the resource matcher from performing a subsequent determination for a given period of time after the positive determination.

20 Claims, 10 Drawing Sheets

(56) References Cited

U.S. PATENT DOCUMENTS

| | | | | |
|---|---|---|---|---|
| 8,397,236 | B2* | 3/2013 | Gibson | G06F 9/4881 718/100 |
| 9,491,112 | B1* | 11/2016 | Patel | H04L 47/70 |
| 9,635,103 | B2* | 4/2017 | Earl | H04L 67/1031 |
| 9,692,707 | B2* | 6/2017 | Tang | H04L 47/70 |
| 2003/0135449 | A1* | 7/2003 | Xu | H04L 47/623 705/38 |
| 2004/0158636 | A1* | 8/2004 | Nakagawa | G06F 9/5016 709/226 |
| 2004/0158694 | A1 | 8/2004 | Tomazin et al. | |
| 2007/0198982 | A1* | 8/2007 | Bolan | G06F 9/5038 718/104 |
| 2007/0198983 | A1* | 8/2007 | Favor | G06F 9/5061 718/104 |
| 2008/0189522 | A1 | 8/2008 | Meil et al. | |
| 2013/0061233 | A1* | 3/2013 | Zhou | G06F 9/4881 718/103 |
| 2013/0339968 | A1* | 12/2013 | Boland | G06F 9/4881 718/103 |
| 2014/0129805 | A1 | 5/2014 | Husby | |
| 2014/0143523 | A1 | 5/2014 | Chadha et al. | |
| 2014/0189377 | A1 | 7/2014 | Subbareddy et al. | |
| 2014/0310504 | A1 | 10/2014 | Kadgi et al. | |
| 2014/0380324 | A1* | 12/2014 | Xiao | G06F 9/5083 718/102 |
| 2015/0161401 | A1 | 6/2015 | Na et al. | |
| 2015/0222564 | A1* | 8/2015 | Wheeler | H04L 47/70 709/226 |
| 2015/0378753 | A1 | 12/2015 | Phillips et al. | |

OTHER PUBLICATIONS

Imam, Nabil et Manohar, Rajit. Address-event communication using token-ring mutual exclusion. In : Asynchronous Circuits and Systems (ASYNC), 2011 17th IEEE International Symposium on. IEEE, 2011. p. 99-108.

SIPO of the P.R China; International Search Report and Written Opinion issued in corresponding International Application No. PCT/CN2016/075999, dated Jun. 12, 2016, 12 pages.

* cited by examiner

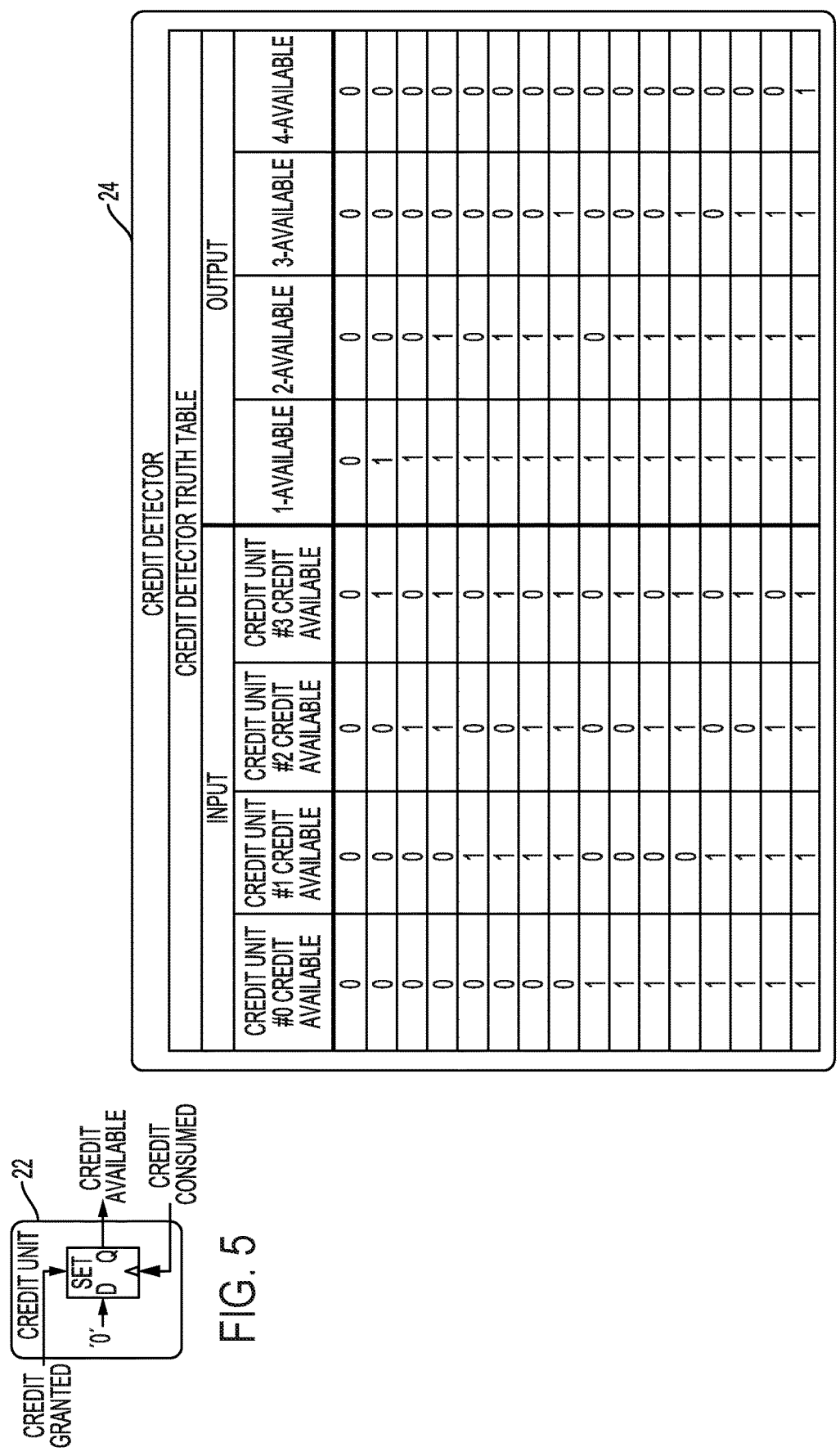

HANDLING INSTRUCTION DATA AND SHARED RESOURCES IN A PROCESSOR HAVING AN ARCHITECTURE INCLUDING A PRE-EXECUTION PIPELINE AND A RESOURCE AND A RESOURCE TRACKER CIRCUIT BASED ON CREDIT AVAILABILITY

FIELD

These improvements generally relate to the field of processors and more specifically to a method of managing the asynchronous attribution of instructions to shared resources.

BACKGROUND

Processors have been provided in the form of electronic chips for decades. During that time, processors have evolved in various ways. Advancements in processor design include: making the processor smaller to increase the speed at which the operations are executed; increasing the number of execution units in a processor to allow execution of multiple instructions in parallel; and developing control units/resource management in order to maximize the utilization of available execution units. As the number of execution units on the chip has increased, so has the size and complexity of the resource management-related features. This added complexity has introduced new challenges to the efficient operation of processors.

Most processors today are 'synchronous' processors in that they typically make use of a common clock to govern control and execution functions. Synchronous control allows for conceptually simpler management of the parallel execution of multiple instructions. Further, since more instructions executed in a given time period often leads to increased processor throughput, there is a strong motivation to increase the speed of the clock to increase performance. However, the speed of the processor's clock is limited by the speed of the slowest one of its functions.

As an alternate design, an asynchronous processor reacts to 'events' rather than waiting for a reference clock. For instance, a signal indicating that a given transaction (e.g., a decoded instruction being dispatched) has been completed can immediately trigger the execution of another transaction. If the 'event' results from a transaction which has a shorter execution time than a the cycle of a reference clock, a faster execution time can be achieved.

Although various forms of control have been developed to enhance or optimize the efficiency of processors, whether operating in synchronous or asynchronous mode, there always remains room for improvement.

SUMMARY

FIG. 1 shows an example of a synchronous pipeline processor governed by a periodic clock executing a program. Instruction execution latencies are deterministic. The use of a fixed computation delay allows for scheduling of the resource availability ahead of time. The processor plans the future availability of the resources and schedules new instructions in advance. More specifically, the processor's central management determines the resource status using the list of the previously executed instructions rather than polling each resource individually for their status. Actual monitoring of the resources is not required, but the scheduler's decision making can only occur at fixed time intervals governed by the clock. As a result, the use of a global reference clock can require a significant quantity of dynamic power.

In the case of a distributed resource managed processor in asynchronous mode, an example of which is shown in FIG. 2, a connectivity network between resources is required to share their statuses. This connectivity network can grow exponentially with additional execution or control units. Since a global reference clock is no longer required, the native latency of the instruction determines the execution time. However, as the numbers of control and execution units in a distributed resource managed processor increases, overhead and latency may increase as well.

In accordance with one aspect, there is provided a processor having a pre-execution pipeline sharing a plurality of resources operable, and thus centrally managed, in asynchronous mode. The resources can be of at least one resource type. Central to the pre-execution pipeline is a resource tracker having a plurality of credit units. Individual credit units are associated with specific shared resources. The expression resource table will be used herein to refer to a group of credit units associated with a given resource type. The processor can include one or more resource tables, for instance. When a shared resource requirement is determined based on the decoded instructions, the corresponding credit unit is checked centrally to establish whether or not the corresponding shared resource is available. If the shared resource is available, the resource is assigned to the dispatched instruction and the central resource tracker is updated to indicate unavailability of the corresponding shared resource. Once the corresponding shared resource has been released and is longer required by the corresponding instruction data, the corresponding shared resource sends a status update to the corresponding credit units and the resource tracker is updated again to indicate the availability of the corresponding shared resource. There may be multiple credit units and/or shared resources.

In accordance with one aspect, there is provided a method of handling instruction data in a processor chip having a pre-execution instruction pipeline sharing a plurality of resources of at least one resource type, and a resource tracker having a plurality of credit units associated with an availability of corresponding ones of the plurality of shared resources. The method can include: the pre-execution instruction pipeline decoding the instruction data to determine a shared resource requirement; checking the resource tracker for the presence of a quantity of credits corresponding to the shared resource requirement; and, upon establishing the presence of the quantity of said credits, i) attributing to the instruction data one or more resources associated with the shared resource requirement from among the plurality of shared resources, and ii) subtracting the quantity of said credits from the resource tracker; and adding the quantity of said credits to the resource tracker when the one or more given resources are no longer used by the instruction data.

In accordance with another aspect, there is provided a processor chip having a pre-execution instruction pipeline sharing a plurality of resources of at least one resource type, the pre-instruction pipeline having a decoder, a resource matcher, a resource tracker having a plurality of credit units associated with the availability of corresponding ones of the plurality of shared resources.

The processor chip can also have an electrical connection between the decoder and the resource matcher to communicate a shared resource requirement, an electrical connection between the resource matcher and the resource tracker to communicate a shared resource availability based on the status of the plurality of credit units.

The pre-execution pipeline is operable to attribute to a corresponding instruction data one or more given resources associated with the shared resource requirement from among the plurality of shared resources. The pre-execution pipeline also updates the status of the corresponding credit units of the resource tracker upon a determination, by the resource matcher, that the shared resource requirement matches resource availability. The processor chip can further have an electrical connection between an output of the one or more given resources and the resource tracker to communicate an availability of the one or more given resources.

In accordance with another aspect, there is provided a resource manager forming a portion of a processor integrated circuit having an instruction decoder and a plurality of shared resources. The resource manager may comprise: a resource tracker having a plurality of credit units connected to corresponding ones of the shared resources in a manner to be updatable based on availability of the resources; a resource matcher connected to receive a resource requirement signal from the decoder and connected to receive a resource availability signal from the resource tracker; and a combinational gate circuit designed based on Karnaugh map methodology to perform a determination of whether or not the resource requirement signal matches the resource availability signal. It will be understood that in practice the signals are typically in the form of a multiple bit signal communicated by an electrical connection in the form of a bus having multiple independent sub-connections associated with the independent bits. Upon a positive determination by the resource matcher, the resource manager dispatches corresponding instruction data to, and to updates the status of, one or more corresponding credit units. The resource manager can also comprise a pulse generator circuit electrically connected to a clock and to the resource matcher and may prevent the resource matcher from performing a subsequent determination for given period of time after the positive determination.

In accordance with one aspect, there is provided a method of handling an instruction data in a processor integrated circuit having: an instruction decoder and a plurality of shared resources; a resource tracker having a plurality of credit units associated with certain corresponding ones of the shared resources in a manner to be updatable based on availability of those shared resources; and a resource matcher connected to receive a resource requirement signal from the decoder and connected to receive a resource availability signal from the resource tracker. The method can include: determining whether or not the resource requirement signal matches the resource availability signal, and, upon a positive determination; dispatching a corresponding instruction data, updating the status of a corresponding one or more of the credit units, and preventing the resource matcher from performing a subsequent determination for given period of time after the positive determination.

Many further features and combinations thereof concerning the present improvements will appear to those skilled in the art following a reading of the instant disclosure.

DESCRIPTION OF THE FIGURES

In the figures,

FIG. 5 is a schematic view of an example of a credit unit of the processor of FIG. 3A;

FIG. 6 is a truth table representation of the input to output relationship of the resource tracker of the processor of FIG. 3A;

DETAILED DESCRIPTION

Figure 3A:
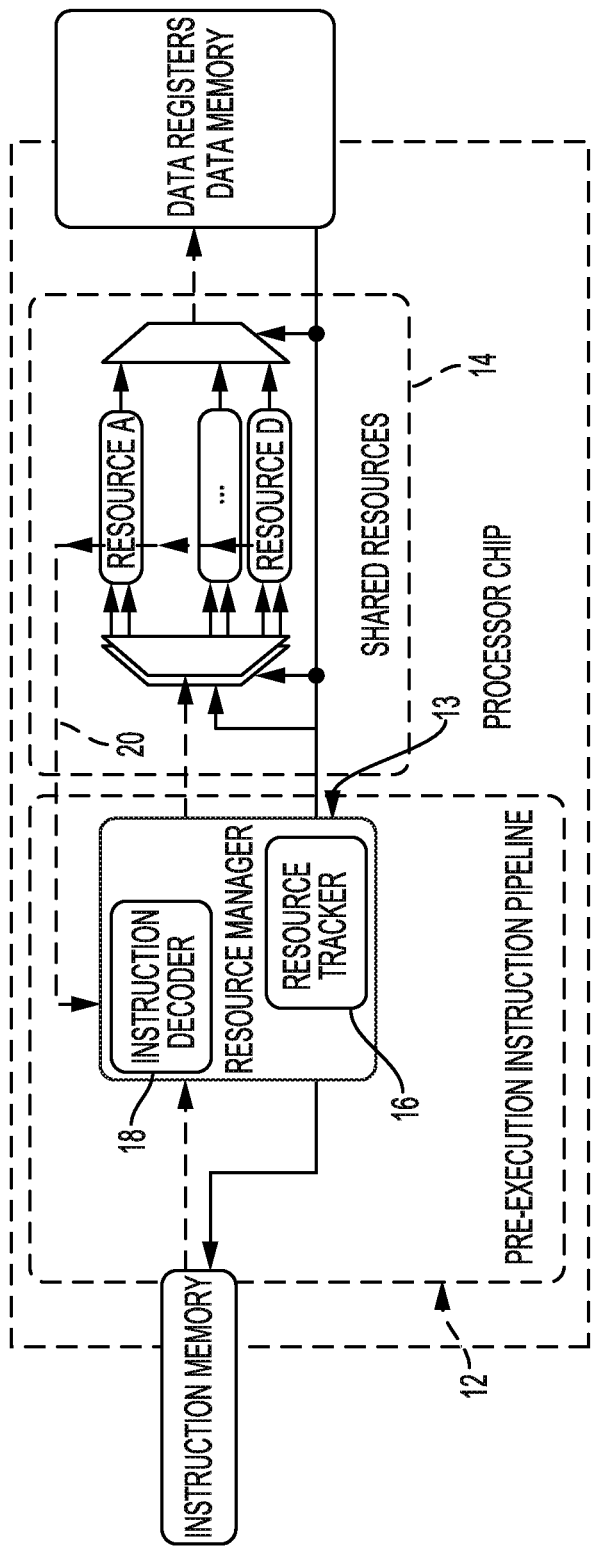
FIG. 3A is a schematic view of an example of a processor in a central resource tracker management mode.

FIG. 3A schematically illustrates an example processor chip 10 having a pre-execution instruction pipeline 12 sharing a plurality of resources 14. Typical embodiments will likely have more than two resources, and likely will have far more than two resources, but a simple case is discussed first to ease understanding. The shared resources 14 can be of a same resource type (e.g., a plurality of individual entries of a queue of a given execution unit) or of a number of different resource types (e.g. individual queue entries of a first execution unit are of a first resource type, individual queue entries of a second execution unit being of a second resource type, individual registers of a shared temporary result storage for both these units being of a third resource type, etc.). These shared resources 14 operate in an asynchronous mode. There is therefore a significant practical limit to the quantity of scheduling which can be done ahead of time. Accordingly, the availability of these shared resources 14 is checked on an individual basis by way of a portion of the integrated circuit which will be referred to herein as the resource tracker 16. It will be understood that the portions of the integrated circuit which are used to manage the resources 14 will be collectively referred to herein by the expression resource manager 13.

Figure 3B:
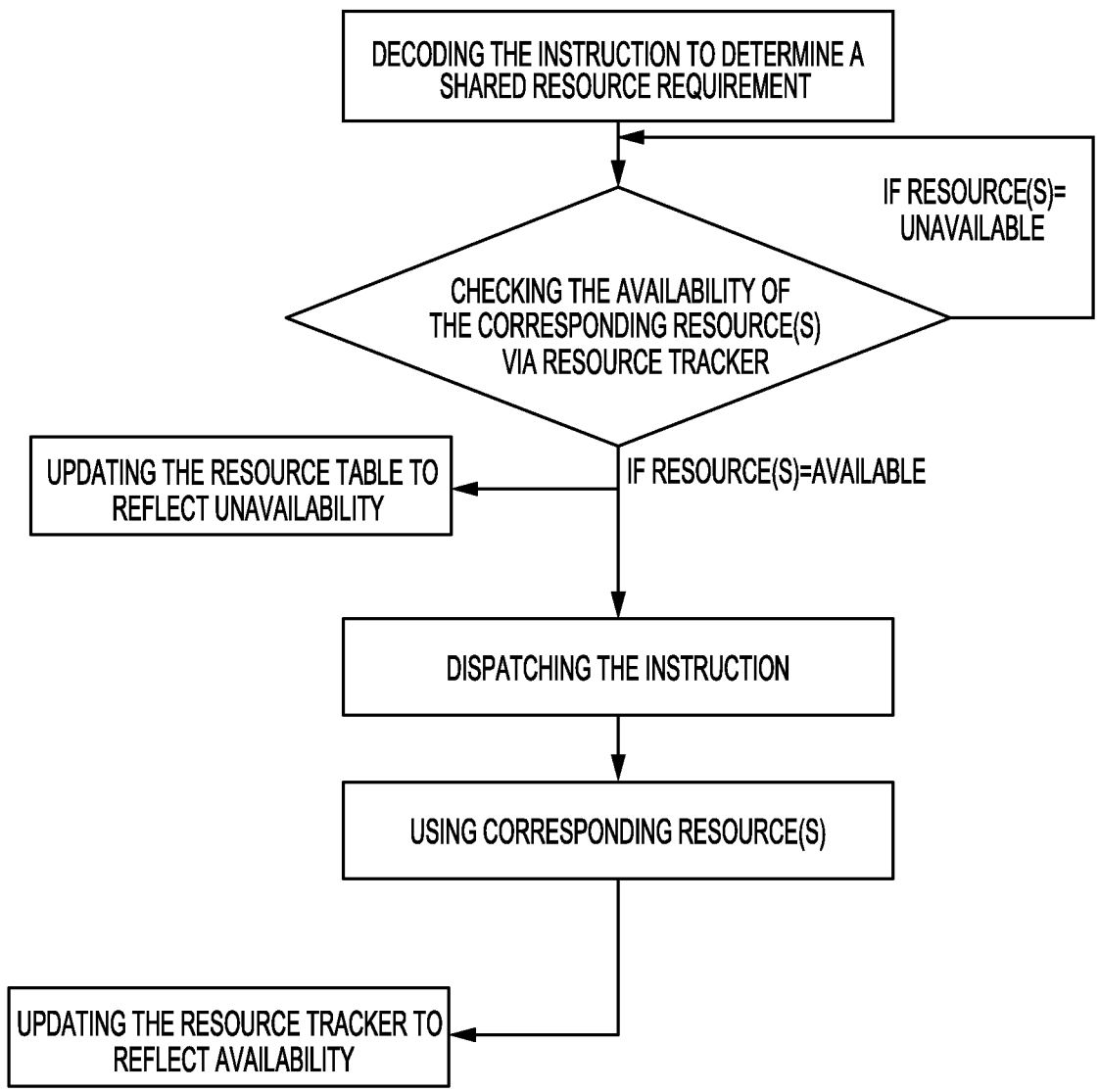
FIG. 3B is a flow chart showing the general mode of operation of the processor of FIG. 3A.

In a general mode of operation, depicted by the arrows in FIGS. 3A and 3B, the pre-execution instruction pipeline 12 includes a decoder 18 for an a priori decoding of the instructions to determine the shared resource requirement associated with a specific one or more of the successive instructions in the pre-execution instruction pipeline 12. The availability of the corresponding resource(s) 14 can be checked via the resource tracker 16, which acts as a form of centralized scoreboard. Dependent upon a determination that the corresponding resource(s) 14 are available, the instruction is dispatched to the corresponding resource(s) 14 (which can be referred to herein as the "one or more given resources thereafter). The resource tracker 16 is 'simultaneously' updated. The resource tracker 16 is later updated to indicate availability only once the one or more given resources 14 have been used and are no longer required by the corresponding instruction data. In this example, the update of the resource tracker 16 can occur simultaneously with the end of the use of the given resource via an electrical connection 20 between the resource output and the resource tracker 16. It will be understood that the expression 'simultaneous' is used herein not in the strict mathematical sense, but rather to refer to expected transmission delays which can be relatively small by comparison to a period of time of execution of the instructions, for instance. Alternate embodiments may comprise more than one instruction pipeline 12 operating simultaneously.

Using this mode of operation, which will be referred to herein as an asynchronous centralized resource-managed mode of operation, efficiency gains can be achieved in certain circumstances and certain applications. For instance, let us consider an example program requiring two resources: a multiplication unit and an addition unit. The example program includes a first instruction data "multiply ×1, ×2, ×3" (where ×2 and ×3 are the source registers or inputs and ×1 is the result destination or output), which takes 2.5 ns to execute on the multiplication unit; a second instruction data "add ×5, ×1, ×4" which takes 0.7 ns to execute on the adding unit (which requires the ×1 output from the first instruction data); and a third instruction data "multiply ×10, ×11, ×11" which takes 1 ns to execute on the multiplication unit (which requires the same execution unit as the first instruction data).

Figure 1:
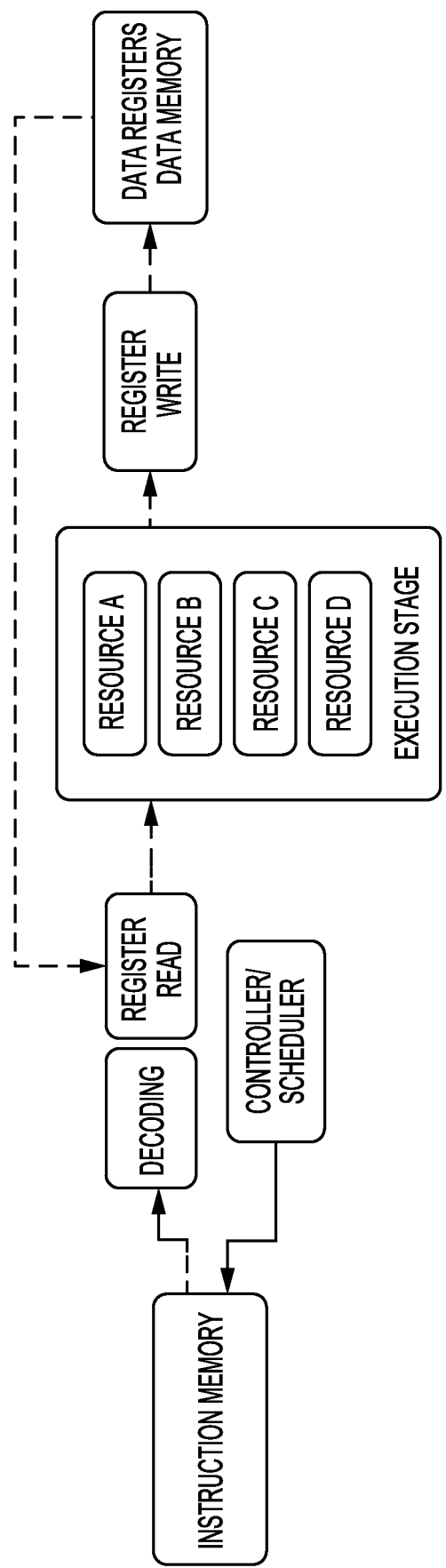
FIG. 1 is a schematic view of an example of a processor in a synchronous pipeline management mode.
Figure 10:
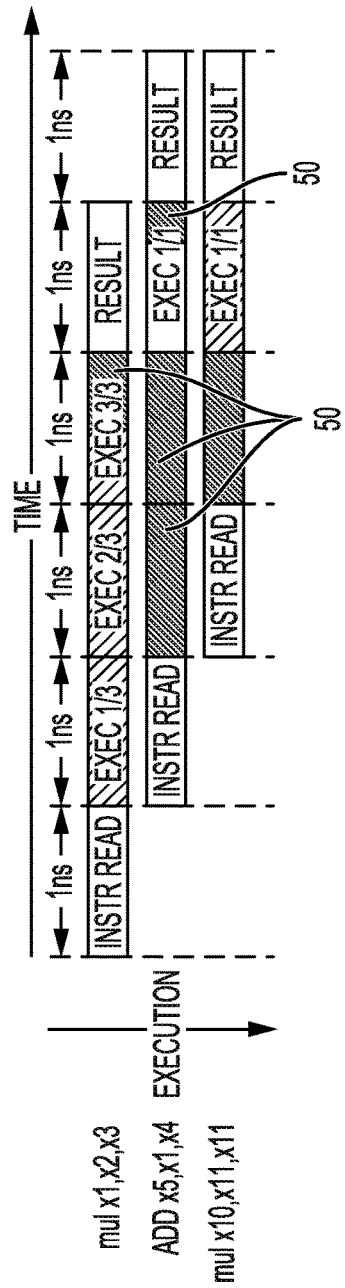
FIG. 10 is a schematic view of an example program execution with the processor of FIG. 1.

The execution of the program using a synchronous pipeline processor using ahead of time resource availability scheduling, such as schematized in FIG. 1, at a 1 GHz pipeline operating frequency, is illustrated in FIG. 10. The oblique hatched line areas 50 represent periods where the processor's resource is idle and the pipeline is stalled. In this scenario, a latency of 500 ps occurs at exec 3/3 of "multiply ×1, ×2, ×3", between the end of the execution of the first instruction data and the beginning of the execution of the third execution data since the execution of the third execution data can only begin at the next clock signal after the multiplication unit becomes free. The native instruction latency completes before the reference clock. Therefore the resource is idle; assigned but not really utilized.

Figure 2:
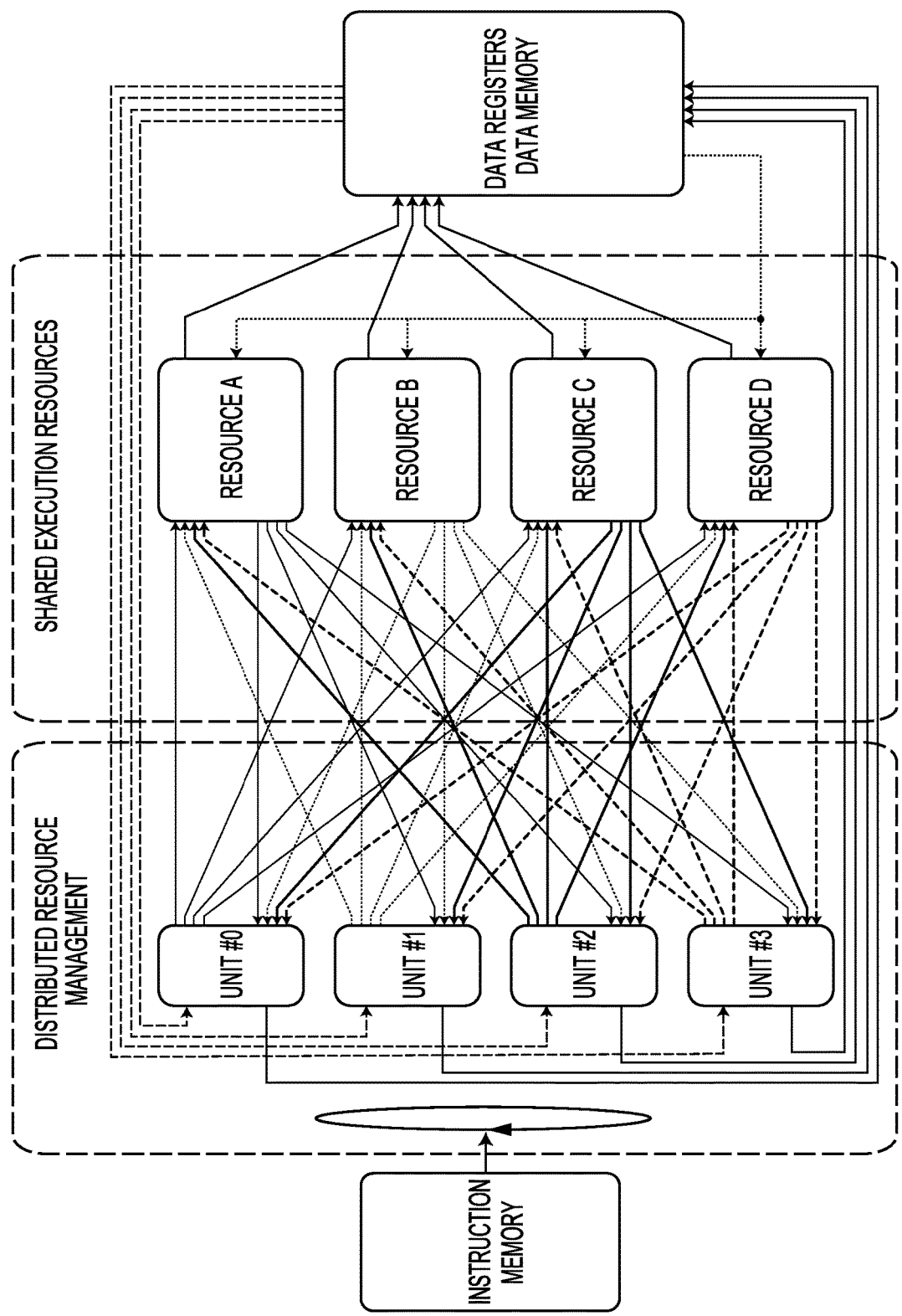
FIG. 2 is a schematic view of an example of a processor in a distributed resource management mode.
Figure 11:
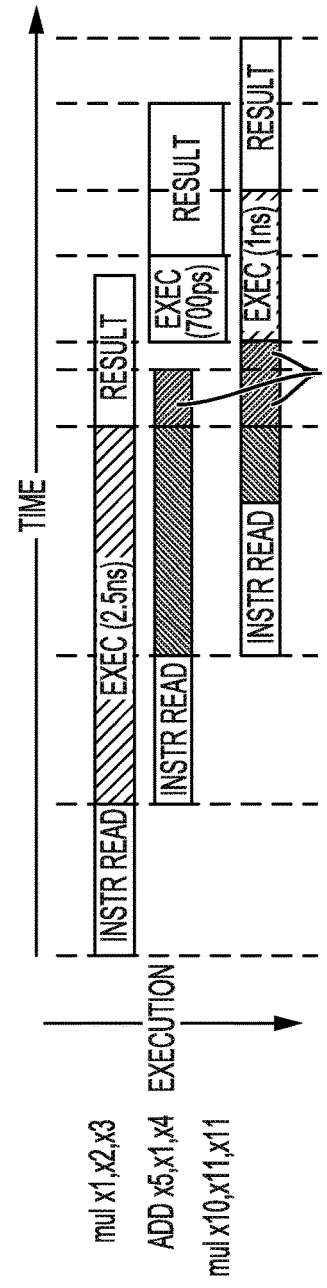
FIG. 11 is a schematic view of an example program execution with the processor of FIG. 2.

The execution of the program using a processor in asynchronous distributed resource management mode such as schematized in FIG. 2 is illustrated in FIG. 11. The second instruction data waits for the results of the first instruction data. The areas 52 represent overhead time to share the resource statuses and arbitrate the exclusive access to a resource between the control units (by mean of token circulation) and to decide whether a shared resource is released by one unit and assigned to another one. The shared register read port is a shared resource which allows a unit to obtain the source operand value from the processor's registers in order to execute the instruction. Accordingly, the shared register read port is requested, arbitrated and granted for the resource to receive its addition input operand, which causes latency. Similarly, the third instruction data waits for the confirmation that the multiplication unit is available. When the multiplication unit becomes available, it is arbitrated and assigned to execute the instruction, which causes latency.

Figure 12:
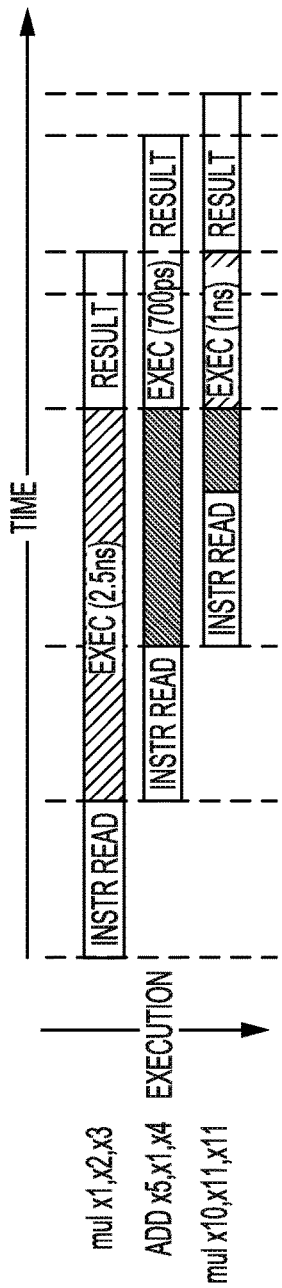
FIG. 12 is a schematic view of an example program execution with the processor of FIG. 3A.

As illustrated in FIG. 12, executing the same program with a management mode (e.g., the mode illustrated in FIGS. 3A and 3B) the latencies of both i) the overhead time of the asynchronous distributed resource management mode shown at 52 in FIG. 11, and ii) the wait for the next clock signal of the synchronous pipeline management mode shown at 50 in FIG. 10 can be considerably minimized.

Figure 4:
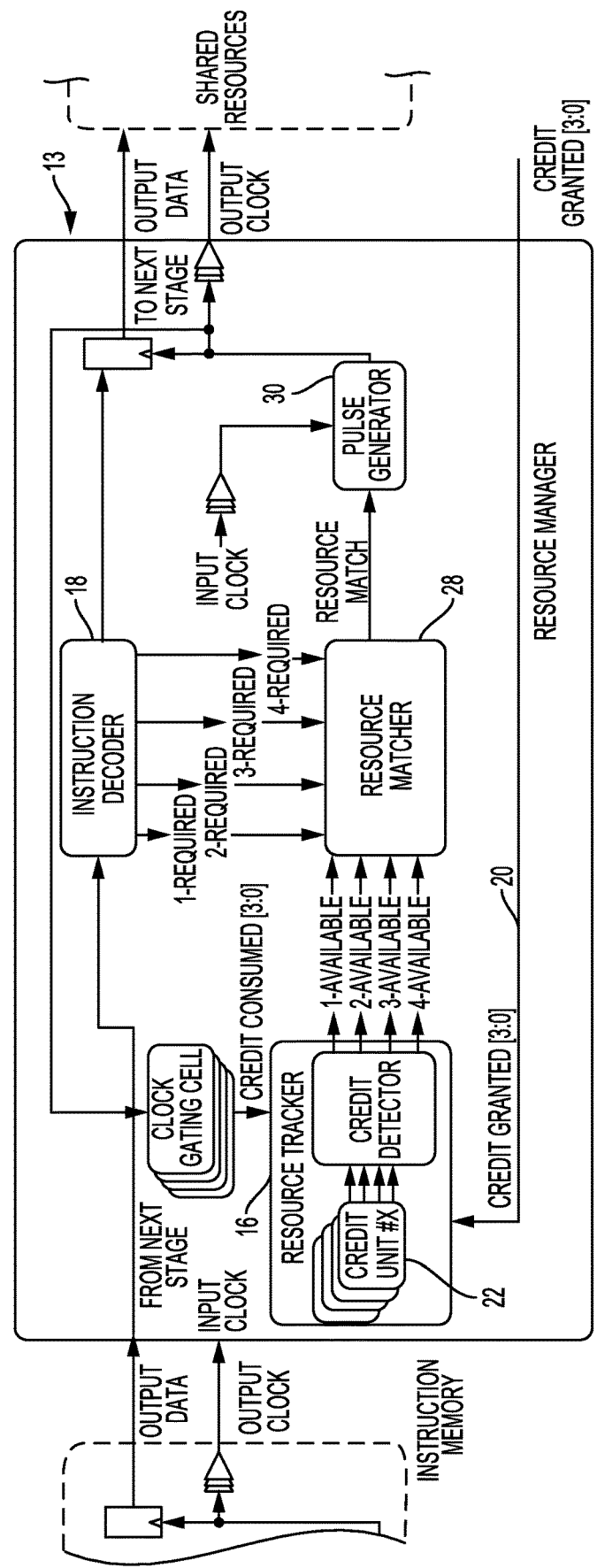
FIG. 4 is a schematic view of an example of a resource manager of the processor of FIG. 3A.

Referring now to FIG. 4, in this example, the resource tracker 16 can be embodied with a plurality of credit units 22, with each credit unit 22 being associated with a corresponding one of the shared resources 14. The decoded shared resource requirement can specify a quantity of required credits (this can be one or more credits) of the same type and/or of multiple types, and the credit units associated with the corresponding resource type are checked to determine if a sufficient quantity of credits are available.

Upon such determination, the instruction data can be dispatched and the update (by subtraction of credits) is performed. Similarly, once the given resource(s) are free (e.g., their use in relation to the dispatched instructions is terminated), they can individually update (by addition of credits) their corresponding credit unit in the resource tracker 16 via the electrical connection 20 in the chip 10. An example of a credit unit 22 is shown in FIG. 5.

In a simple scenario, the instruction decoder 18 can be adapted to decode only a single instruction at a time, in which case the resource matcher 28 and the resource tracker 16 can be fairly simple and can be tasked with checking whether or not a particular resource 14 associated with the instruction is available. Typical embodiments, however, can be more complex, comprising an instruction decoder 18 adapted to decode a plurality of instructions at once. In such a 'multiple instruction' embodiment, the resource matcher 28 and the resource tracker 16 can also be adapted to deal with more than one instruction, and more than one resource request of the same type, at once. In a case where the instruction decoder 18 supports multiple decoding within a single instruction, the decoder 18 can require resources of more than one type (e.g. 1 queue entry and 1 temporary storage register) at once.

An example of such a more complex embodiment is detailed below. This example embodiment uses a resource tracker 16 in which the credit units 22 are grouped in a number of tables associated with corresponding resource types, and the resource matcher 28 has a more complex logic circuit to determine the simultaneous availability of all required resources. Dedicated resource tables can be used for one or more specific resource types, for instance. In this specification, the expression 'instruction data' will be used to refer to the instruction which is to be decoded, whether this instruction includes a plurality of 'sub-instructions' associated with a plurality of resources 14 or only a single instruction associated with a single resource 14.

An instruction associated with one of the resources 14 can require one or more 'credits'. For instance, in a case of speculative execution where the resource 14 is an arithmetic and bit manipulation unit, a single instruction can include one=requests for a queue entry, and thus associate one credit, and one request for a temporary register to temporarily store the result of the execution once executed and make it available to another instruction. In such an example, comprising both a multiplication and division (MUL) unit, an arithmetic & bit manipulation (ADD) unit, and a temporary storage register shared between the MUL and the ADD units, both the MUL and the ADD units can have corresponding, independent, instruction queues. This example can be considered to have three (3) resource types: 1) the MUL queue, 2) the ADD queue, and 3) the temporary storage. Each resource type can have its own resource table in the resource tracker 16, with each resource table having a corresponding number of credit units. An example distribution of credits can be as follows:

MUL queue: 4 credits;
ADD queue: 6 credits;
Temporary storage: 4 credits.

Continuing with this example, an example instruction data can have a given bit allocation for an opcode (which can indicate whether the instructions apply to the MUL or to the ADD unit, for instance), up to two or three source registers and a destination register.

In practice, one challenge in embodying this solution is to avoid potential errors which might result from reading the resource tracker status if it has not been updated since the last dispatch of instructions.

Figure 7:
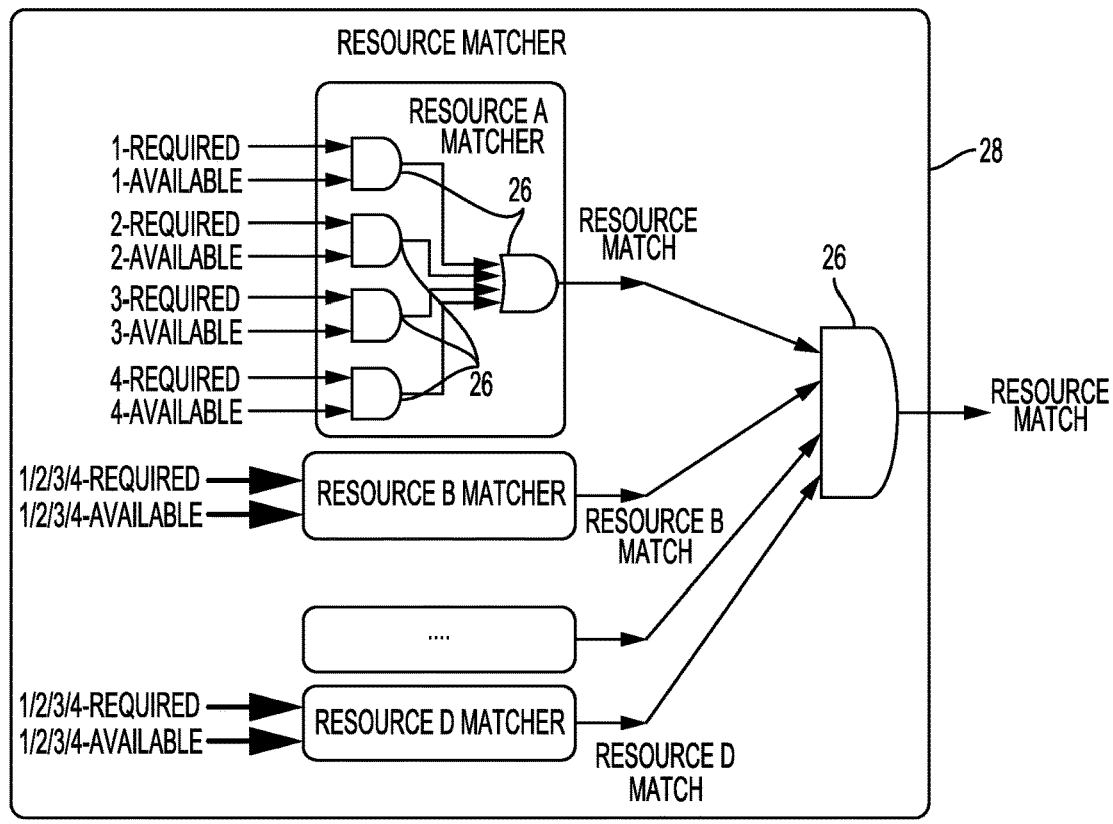
FIG. 7 is a schematic view of an example of a logic-based resource matcher for the processor of FIG. 3A.

In this specific example, this challenge is addressed on one front by designing the resource tracker 16 in a manner to avoid glitches in the indication of credit availability. More specifically, the indication of credit availability uses the individual credit units which are read via a resource matcher 28 having a combinational gate circuit (e.g., logical gates 26). Indication of credit availability is made glitchless using the Karnaugh Map methodology, an example of which is shown in the credit dector 24 of FIG. 6 and the resource matcher of FIG. 7, to match the resources 14. Indeed, using the Karnaugh Map methodology, redundant paths can be created to avoid glitches.

Figure 9:
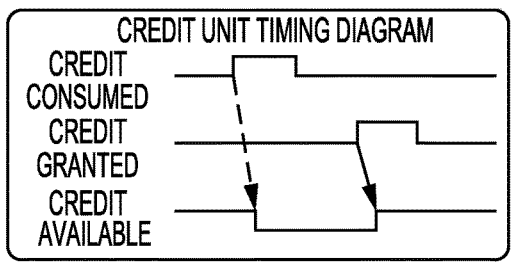
FIG. 9 is a schematic view of an example credit unit timing diagram for the processor of FIG. 3A.

The possibility of basing the 'matching' of the instruction data based on an 'out of date' reading of the credit units of the resource tracker 16 also poses a challenge. For example, values may be read prior to the complete updating of the resource tracker 16). In this specific example, this challenge is addressed by way of a pulse generator which, based on a timed input associated with an updating delay, masks any new requests that could be generated based on an outdated resource status. This process is shown in FIG. 9. Here, a single pulse is generated. The rising edge of the pulse is used to "enable" the sequential elements connected to the pulse to "sample and hold" the input on their output. In this specification, the pulse generation can be considered as being based on a clock signal given its 'period' feature. It will be understood that this expression does not imply that the pulse generation is governed by the rhythmic rise and fall of a central clock.

Indeed, since register (flip-flop, or FF, or sequential logic) gates are used to implement the credit units, glitches are not created. Glitches could stem, however, from the combinational logic (i.e., AND, OR, XOR, . . . gates) where inputs arrive at different times and the logic function of the gates creates very small pulses (i.e., glitches) until the logic circuit is stabilized. An example pulse generator 30 generates a suitable on-demand pulse of a given duration (a clock pulse) in this context, is illustrated in FIG. 8.

Figure 8:
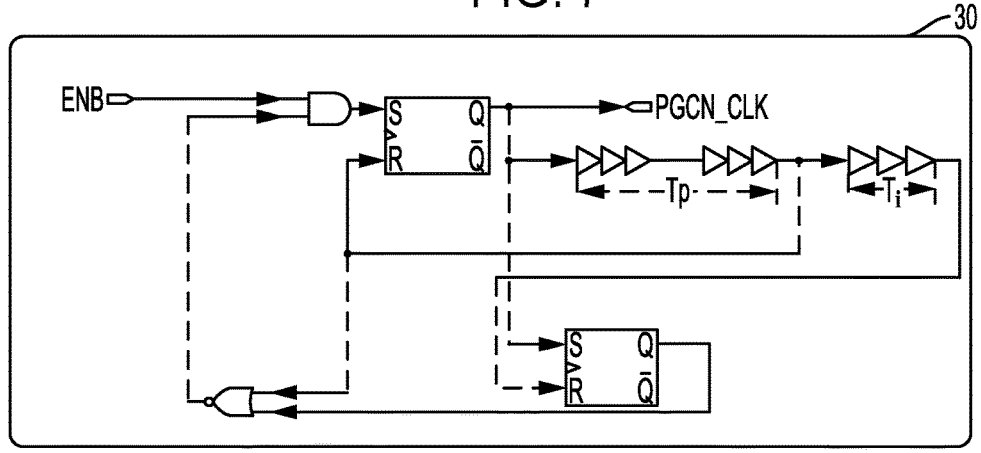
FIG. 8 is a schematic view of an example on-demand clock-based pulse generator for the processor of FIG. 3A.

In FIG. 8, the pulse generator 30 generates a mask which is active during a certain period of time after the resource match, during which all subsequent requests are ignored. More specifically, upon generating a pulse, the corresponding credit(s) are updated as no longer being available. The process of updating the credit can take a certain period of time to stabilize. If a reading is performed prior to the stabilization, a previous version, or an otherwise incompletely updated version of the resource table can be read. Preventing the reading of the resource tracker 16 during this period can avoid potential dispatch of new instructions where the update from a previous dispatch is not yet completed, and where the resource would be incorrectly indicated as being available when, in fact, it is not. The returning of the credits, by comparison, can occur at any moment and the associated combinational gate circuit is thus required to be glitchless.

Referring back to the example presented above, but using a glitchless circuit, the instruction decoder 18 receives the instruction data and communicates resource requests to the resource matcher 28 as follows: 3 credits for the ADD queue and 1 credit for the temporary storage register. A first combinational gate circuit of the resource matcher 28 accesses a first table of the resource tracker 16 to check the availability of the three (3) credits for the ADD queue. A second combinational gate circuit accesses a second table of the resource tracker 16 to check the availability of the temporary storage register 21. An 'and' gate is provided at the end of the individual, table-specific, logic gate circuits, to combine all the resource types, match statuses, and to trigger the pulse generator 30 and dispatch the instruction only if all the resource requirements are satisfied.

In this specification, the expression combinational gate circuit will be used freely to encompass embodiments having a single combinational gate circuit associated with a given type of resource, or having a multitude of individual combinational gate circuits combined to one another via an 'and' gate.

This particular glitchless combinational gate circuit and pulse generator combination can alternately be embodied, for example, in a very simple processor without speculative execution capability. For example, a processor having only a single resource and being only adapted to treat a single instruction at a time. Such an embodiment can be useful in performing tests, for instance.

Figure 13:
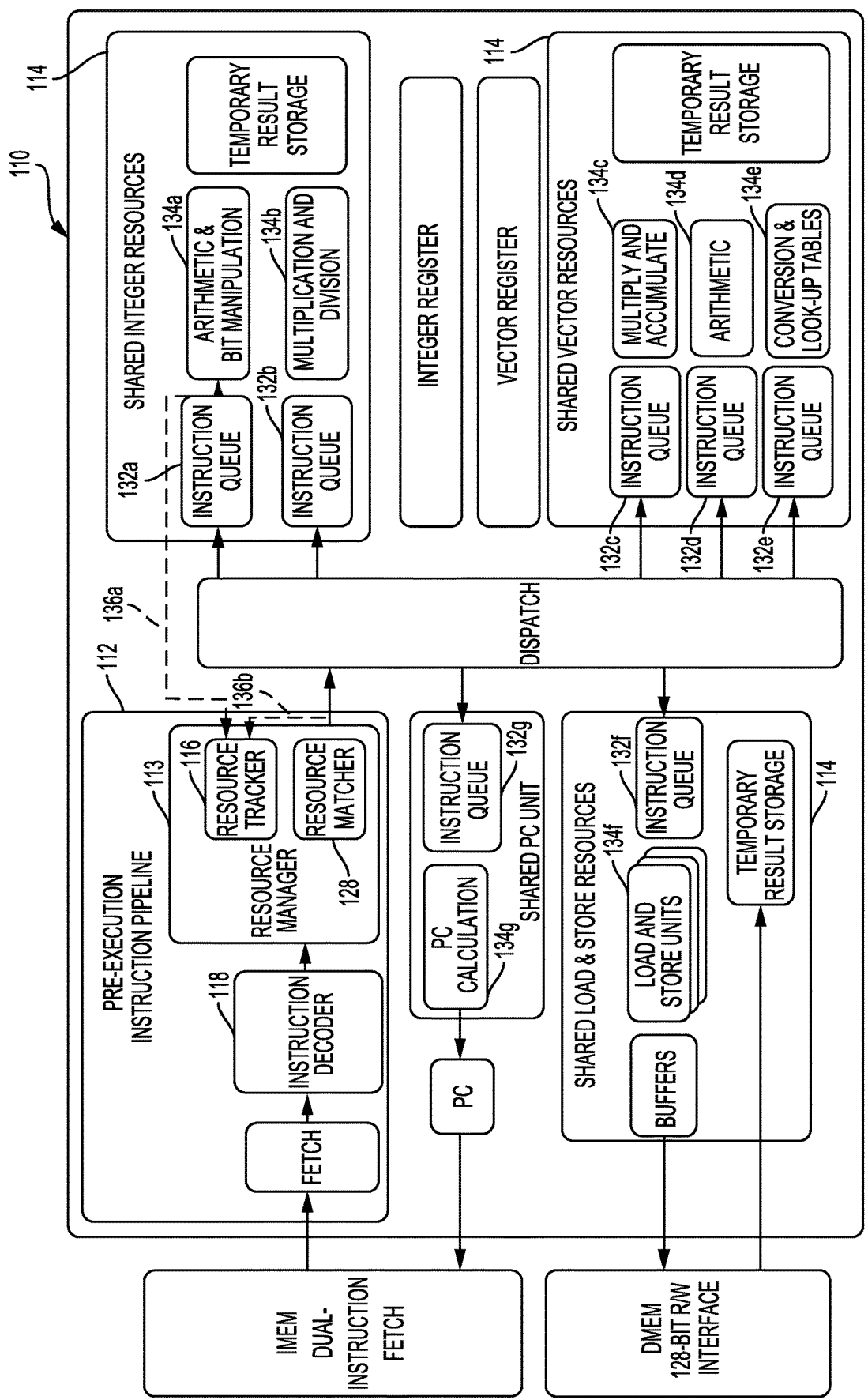
FIG. 13 is a schematic view of an alternate example of a processor having a central resource tracker management mode.

FIG. 13 schematizes an example of a more detailed processor 110 where the mode of management of shared resources 114 can be performed. In a first scenario, the shared resources 114 can be a plurality of entries of one or more queues 132a-g associated with respective execution units 134a-g. An example where the respective execution unit is an arithmetic & bit manipulation unit 134a is illustrated by electrical connections 136a,b (shown in dashed-dot lines). For each subsequent instruction, a corresponding credit is allocated and subtracted from the corresponding credit unit. As each instruction is individually transferred from the queue to the execution unit, the respective credit unit is updated to indicate availability.

In another example, any single instruction data can require more than one entry in the queue. In both these scenarios, if a request is made for a given quantity of credits, and the given quantity of credits is determined to be unavailable, the pipeline 112 can stall the instructions until: i) a corresponding quantity of further instructions are processed by the corresponding execution unit 134a-g; ii) the resource tracker 116 has been updated; and iii) the given quantity of credits are determined to be available. In such an embodiment, the resource manager 113 can further include an instruction tracker adapted to monitor 'in flight' instructions, with each 'in flight' instruction being associated with a unique tag. However, it will be understood that such an instruction tracker is application-specific and can be avoided in alternate embodiments. The expression 'in flight' is used here to refer to an instruction which has been dispatched. The 'in flight' status is cleared when the instruction is terminated.

In this embodiment, the seven queues can each be associated with a corresponding one of the resource tables (the load and store unit can have two credits, for instance), and all the resource tables can be dealt with using a common instruction decoder 118 and resource matcher 128. A common matcher and pulse generator constrain the given pipeline 112 to wait for all resources of all decoded instructions to be available. In a processor that has more than one pre-execution pipeline 112 (i.e., a processor that fetches and decodes multiple instructions in parallel) multiple instances of the decoder 118, resource matcher 128, and pulse generator can be provided—one per decoded instruction. Corresponding groups of the resource tables can be associated with each combination to allow individual instruction dispatch.

The pre-execution instruction pipeline 112 can receive a sequence of instructions. Each individual instruction can have at least one request for a corresponding type of shared resource 114. The flow of instruction data can travel sequentially from one stage to another and each individual instruction data can be allowed to move from the evaluation (pre-execution) to the execution stage if the required quantity of credits is available. Accordingly, in one example, the pre-execution pipeline 112 can match the corresponding instruction with one or more required resource(s) or potentially stall the pipeline 112. Once dispatched, the instructions are demultiplexed to the different execution units 134 a-g. A plurality of examples of shared resources 114 which can have instruction queues 132a-g with potentially varying quantities of entries, are shown in FIG. 13 such as integer arithmetic and bit manipulation unit 134a, integer multiplication and division unit 134b, vector multiply and accumulate unit 134c, vector arithmetic unit 134d, vector conversion & look-up table unit 134e, load and store unit(s) 134f, pc calculation unit 134g, etc. In a variant, a different combination of resource types can be present, including other resource types than those illustrated, and some or all of the resource types can be provided without queues. In still another variant, a given resource table can be shared between more than one resource type. It will be understood that even though the pipeline 112 is stalled if there are no credits for the required resource and the required resource is thus unavailable, the chip as a whole can be designed specifically for a given application in a manner which minimizes such occurrences. For example, instances where the pipeline is stalled may be avoided by providing a satisfactory relative quantity of resources or queues based on an expected relative demand from the specific application.

An example set of guidelines which can be applicable embodiments described above are now provided. These guidelines relate to FIGS. 3A to 9 in particular:

1. within a stage, resource requests can be limited to a total number of resources provided;
2. resource-available signals can be made glitchless by design;
3. input clock can be delayed to match the delay of the instruction decoder 18 to ignore potential glitches in generating resource-required signals; and
4. consumed credit can originate from the generated clock with a mask that selects which resource(s) to assign.

The quantity of credit units associated with the corresponding resources 114 can be equal to the quantity of the corresponding resources or different than the quantity of the corresponding resources. For instance, in embodiments presented above, the quantity of credit units associated with the corresponding resources was equal to the quantity of corresponding resources (e.g., 4-entry queue has 4 credit units). In an alternate embodiment, resource matching is not performed based on the actual availability of the resource. Rather, the resource matching of a resource which is to be consumed a significant amount of time (e.g., queue time) after having been allocated can be performed based on an expected availability of the resource and the actual availability of the resource can be confirmed immediately before use. The expected availability of the resource can be tracked using a quantity of credits which is greater than the quantity of resources these credits are used to track. This can be described as allocating virtual resources rather than allocating physical resources. This resource allocation strategy can also be referred to as oversubscription of the resource of interest. An example of such an allocation will now be presented.

Figure 14:
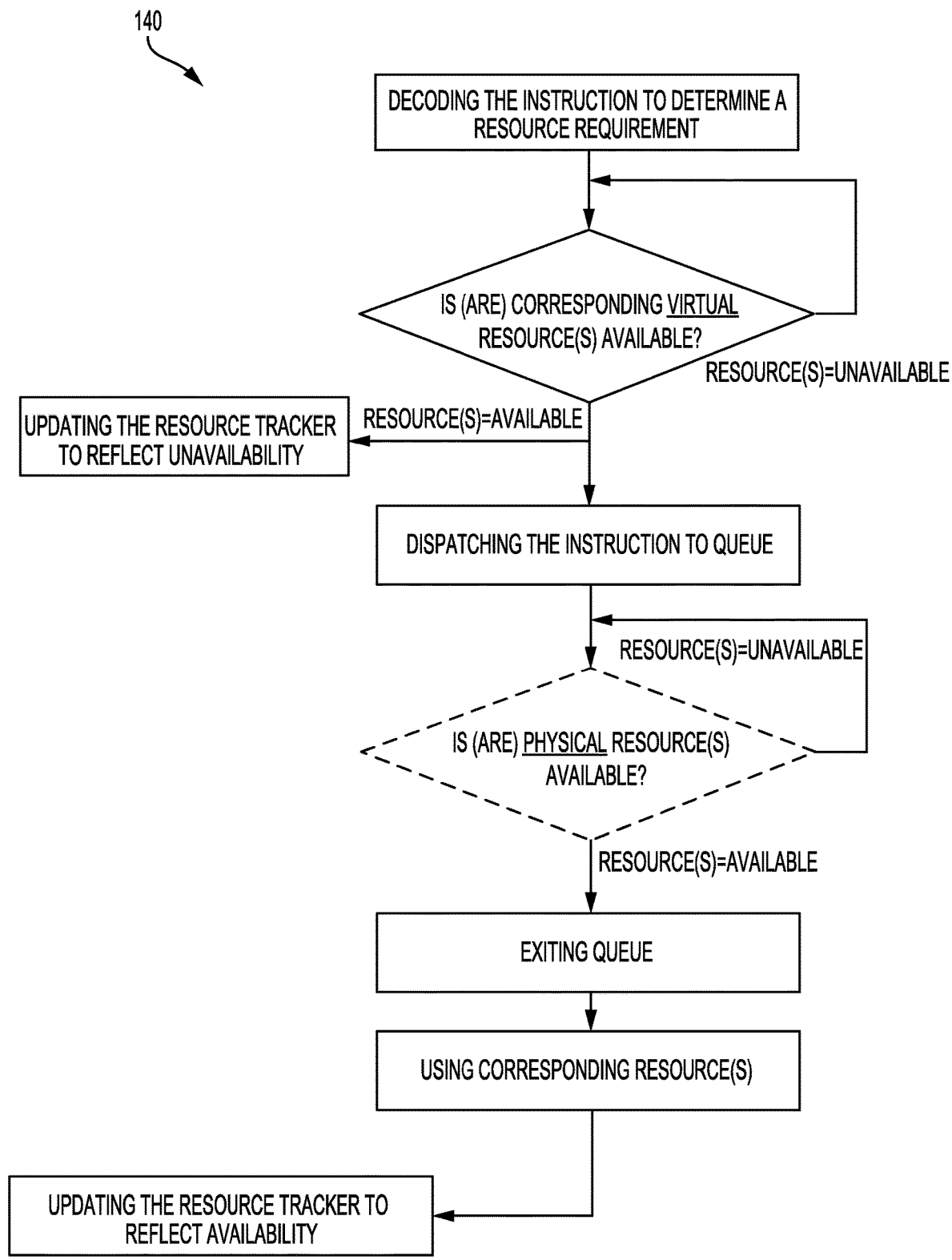
FIG. 14 is a flow chart showing tracking of the availability of a resource of interest using virtual credits in an oversubscription control mode.

An example of an oversubscribed mode of operation is illustrated in the flow chart 140 presented in FIG. 14. This mode of operation can be applied to one or more of the resources (herein the "resource(s) of interest") which is used in relation to a corresponding instruction only a certain amount of time after having been dispatched by the pre-execution pipeline 112. For example, the temporary registers in FIG. 13 may only be used after having proceeded along the cue subsequent to the execution of an instruction by one of the execution units 134a, g.

The decoder 118 decodes a specific one of the instruction data (herein the "given instruction data") and determines from the instruction data that there is a requirement for the resource(s) of interest in relation with this instruction data. The requirement can be for one or more of the resource(s) of interest, but let us consider now an example where the requirement is for a single one of the resources of interest (herein the "given resource of interest"). The resource tracker 116 has, for the given resource of interest, more than one credit available, and the resource of interest is thus oversubscribed. In this context, the credits can specifically be referred to as virtual credits. The resource matcher 128 accesses the resource tracker 116 to determine whether a virtual credit for the given resource of interest is available and, upon determining the availability of one virtual credit, dispatches the instruction. The resource tracker 116 is simultaneously updated to subtract the virtual credit corresponding to the dispatched given instruction data. In the embodiment illustrated, an additional checking step is performed prior to allowing the given instruction data to exit the queue and to be processed by the corresponding execution unit, to ensure that the actual, physical, resource of interest is indeed available and to prevent collision with the results of another instruction data in the temporary storage. The virtual credit is returned to the resource tracker 116 (added) only once the use of the given resource of interest in relation with the given instruction data is deemed to have ended.

In other words, with the mode of operation illustrated in FIG. 14, in an example where two virtual credits are available for the given resource of interest, a first instruction data decoded as requiring the given resource of interest can be assigned to this given resource of interest by consuming a first virtual credit of the given resource of interest. Prior to the use of the given resource in relation with the first instruction data, a second instruction data can be decoded as also requiring the given resource of interest and also be assigned to the given resource of interest by consuming the second virtual credit. The given resource of interest is consumed in relation to the first instruction data while the second instruction data is still in the queue, and the first virtual credit is released once the use of the resource of interest in relation with the first instruction data has ended. After the second instruction data has exited the queue and has been executed by the associated execution unit, the resource of interest is available.

As can be understood, the examples described above and illustrated are intended to be exemplary only. Alternatives to the examples provided above are possible in view of specific applications. For instance, emerging 5G technology, as well as future technologies, will require higher performance processors to address ever growing data bandwidth and low-latency connectivity requirements. New devices must be smaller, better, faster and more efficient. Some embodiments of the present disclosure can specifically be designed to satisfy the various demands of such technologies. Embodiments of the present disclosure can also be used to upgrade equipment in the field to support new technologies or to improve future performance within existing power constraints, thus keeping replacement costs low, to name two possible examples. Specific embodiments can specifically address silicon devices, 4G/5G base stations and handsets (with handset applications being possibly focused on low power consumption to preserve battery power for instance), existing network equipment replacement, future network equipment deployment, general processor requirements, and/or more generally the increase of processor performance. In an alternate embodiment, for instance, the processor can be of non-speculative execution and have two or more shared execution units. The processor can be embodied as a digital processing unit (DSP), a central processing unit (CPU) or in another form. The scope is indicated by the appended claims.

What is claimed is:

1. A method of handling instruction data in a processor including a pre-execution instruction pipeline sharing a plurality of shared resources of one or more resource types, and a resource tracker circuit having a plurality of hardware credit unit storage elements, each of the plurality of hardware credit unit storage elements associated with an availability of a corresponding shared resource of the plurality of shared resources, the method comprising:
decoding, by the pre-execution instruction pipeline, the instruction data to determine a shared resource requirement, the shared resource requirement indicating a first shared resource of the plurality of shared resources and a required credit value required for the instruction data;
checking the resource tracker circuit for a first credit value stored in a first hardware credit unit storage element of the plurality of hardware credit unit storage elements, the first hardware credit unit storage element corresponding to the first shared resource, wherein the checking the resource tracker circuit comprises using a resource matcher circuit having a combinational gate circuit including at least one redundant path for avoiding glitches in an output of the resource matcher circuit;
determining that the first shared resource is available based on the first credit value stored in the first hardware credit unit storage element and the required credit value indicated in the shared resource requirement;
upon the determining that the first shared resource is available:
dispatching the instruction data to the first shared resource among the plurality of shared resources; and
generating a first signal to update the first credit value stored in the first hardware credit unit storage element; and
when the first shared resource is no longer used by the instruction data, asynchronously generating a second signal to update the first credit value stored in the first hardware credit unit storage element to indicate the first shared resource is available.

2. The method of claim 1 wherein the generating the first signal includes activating a pulse having a given duration, the pulse causing the pre-execution instruction pipeline to ignore subsequent shared resource requirements for said given duration.

3. The method of claim 1 wherein the shared resource requirement is associated with one or more entries of a queue leading to an execution unit, the queue having a plurality of entries.

4. The method of claim 1 wherein the plurality of shared resources are of a plurality of resource types, and wherein the resource tracker circuit has a plurality of resource tables, each resource table having hardware credit unit storage elements corresponding to at least one of said plurality of resource types.

5. The method of claim 1 wherein a credit value in one of the plurality of hardware credit unit storage elements of the resource tracker circuit associated with the availability of a first corresponding shared resource is equal to a credit value of the first corresponding shared resource.

6. The method of claim 1 wherein a first corresponding shared resource has a second credit value and is accessible via a queue having a plurality of entries.

7. The method of claim 6 wherein the first corresponding shared resource is a temporary result storage resource.

8. The method of claim 1,
wherein the determining comprises determining the first shared resource is available based on the first credit value stored in the first hardware credit unit storage element being greater than or equal to the required credit value indicated in the shared resource requirement,
wherein the generating the first signal comprises generating the first signal to subtract the required credit value from the first credit value stored in the first hardware credit unit storage element, and
wherein asynchronously generating the second signal comprises asynchronously generating the second signal to add the required credit value to the first credit value stored in the first hardware credit unit storage element.

9. A processor comprising:
a pre-execution instruction pipeline sharing a plurality of shared resources of one or more resource types, the pre-execution instruction pipeline including:
a decoder;
a resource matcher circuit;
a resource tracker circuit having a plurality of hardware credit unit storage elements, each of the plurality of hardware credit unit storage elements associated with an availability of a corresponding shared resource of the plurality of shared resources; and
an electrical connection between the decoder and the resource matcher circuit to communicate a shared resource requirement,
the pre-execution instruction pipeline being operable to:
decode instruction data to determine the shared resource requirement, the shared resource requirement indicating a first shared resource of the plurality of shared resources and a required credit value required for the instruction data;
check the resource tracker circuit for a first credit value stored in a first hardware credit unit storage element of said hardware credit unit storage elements, the first hardware credit unit storage element corresponding to the first shared resource, by using the resource matcher circuit having a combinational gate circuit including at least one redundant path for avoiding glitches in an output of the resource matcher circuit;

determine that the first shared resource is available based on the first credit value stored in the first hardware credit unit storage element and the required credit value indicated in the shared resource requirement;

upon determining that the first shared resource is available:

dispatch the instruction data to the first shared resource among the plurality of shared resources; and generate a first signal to update the first credit value stored in the first hardware credit unit storage element; and update the first credit value stored in the first hardware credit unit storage element to indicate the first shared resource is available when the first shared resource is no longer used by the instruction data.

10. The processor of claim 9 further comprising a pulse generator electrically connected to a clock and to the resource matcher circuit and operable to prevent the resource matcher circuit from performing a subsequent determination for a given duration upon dispatching of the instruction data.

11. The processor of claim 9 wherein the shared resource requirement is associated with one or more entries of a queue leading to an execution unit, the queue having a plurality of entries.

12. The processor of claim 9 further including a resource manager circuit including multiple resource tracker circuits, the multiple resource tracker circuits including the resource tracker circuit, each of the multiple resource tracker circuits being associated with a corresponding stage of the resource manager circuit, and each stage being associated with one of said one or more resource types.

13. The processor of claim 9 wherein a credit value in one of the plurality of hardware credit unit storage elements of the resource tracker circuit associated with the availability of a first corresponding shared resource is equal to a credit value of the first corresponding shared resource.

14. The processor of claim 9 wherein a first corresponding shared resource has a second credit value, and is accessible via a queue having a plurality of entries.

15. The processor of claim 14 wherein the first corresponding shared resource is a temporary result resource.

16. A resource manager circuit of a processor integrated circuit, the processor integrated circuit having an instruction decoder and a plurality of shared resources of one or more resource types, the resource manager circuit comprising a resource tracker circuit, the resource manager circuit further including:

a plurality of hardware credit unit storage elements, each of the plurality of hardware credit unit storage elements associated with an availability of a corresponding shared resource of the plurality of shared resources;

a resource matcher circuit configured to:

receive a shared resource requirement signal from the instruction decoder, the shared resource requirement signal indicating a first shared resource of the plurality of shared resources and a required credit value required for instruction data; and receive a resource availability signal from the resource tracker circuit; and a combinational gate circuit to perform a determination of whether or not the shared resource requirement signal matches the resource availability signal, the combinational gate circuit including at least one redundant path for avoiding glitches in an output of the resource matcher circuit;

the resource manager circuit being operable to:

check the resource tracker circuit for a first credit value stored in a first hardware credit unit storage element of said hardware credit unit storage elements, the first hardware credit unit storage element corresponding to the first shared resource of the plurality of shared resources;

determine that the first shared resource is available based on the first credit value stored in the first hardware credit unit storage element and the required credit value indicated in the shared resource requirement signal;

upon determining that the first shared resource is available:

dispatch the instruction data to the first shared resource among the plurality of shared resources; and generate a first signal to update the first credit value stored in the first hardware credit unit storage element; and update the first credit value stored in the first hardware credit unit storage element to indicate the first shared resource is available when the first shared resource is no longer used by the instruction data; and a pulse generator circuit electrically connected to a clock and to the resource matcher circuit and being operable to prevent the resource matcher circuit from performing a subsequent determination for a given period of time after the determining that the first shared resource is available.

17. The resource manager circuit of claim 16 wherein a shared resource requirement is associated with one or more entries of a queue leading to an execution unit.

18. The resource manager circuit of claim 16 wherein the resource tracker circuit has more than one resource table, each resource table grouping hardware credit unit storage elements associated with at least one of a plurality of resource types.

19. The resource manager circuit of claim 16 wherein a credit value in one of the plurality of hardware credit unit storage elements of the resource tracker circuit associated with a first corresponding shared resource is equal to a credit value of the first corresponding shared resource.

20. The resource manager circuit of claim 16 wherein a first corresponding shared resource has a second credit value, and is accessible via a queue having a plurality of entries.

* * * * *